US011645841B2

(12) United States Patent
Chastain et al.

(10) Patent No.: US 11,645,841 B2
(45) Date of Patent: May 9, 2023

(54) AUGMENTED REALITY EVENT SWITCHING

(71) Applicant: AT&T Intellectual Property I, L.P., Atlanta, GA (US)

(72) Inventors: Walter Cooper Chastain, Atlanta, GA (US); Barrett Kreiner, Woodstock, GA (US); James Pratt, Round Rock, TX (US); Adrianne Binh Luu, Atlanta, GA (US); Robert T. Moton, Jr., Alpharetta, GA (US); Ari Craine, Marietta, GA (US); Robert Koch, Peachtree Corners, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/461,240

(22) Filed: Aug. 30, 2021

(65) Prior Publication Data

US 2023/0063505 A1   Mar. 2, 2023

(51) Int. Cl.
*G06V 20/20* (2022.01)
*G06T 19/00* (2011.01)
*G06F 3/04815* (2022.01)
*G06V 20/40* (2022.01)

(52) U.S. Cl.
CPC .......... *G06V 20/20* (2022.01); *G06F 3/04815* (2013.01); *G06T 19/006* (2013.01); *G06V 20/42* (2022.01); *G06V 20/44* (2022.01)

(58) Field of Classification Search
CPC ........ G06V 20/20; G06V 20/42; G06V 20/44; G06F 3/04815; G06T 19/006
See application file for complete search history.

(56) References Cited

U.S. PATENT DOCUMENTS

| 7,796,155 B1 * | 9/2010 | Neely, III | G06V 20/52 348/157 |
| 9,268,406 B2 * | 2/2016 | Geisner | G06F 3/017 |
| 9,990,028 B2 * | 6/2018 | Basra | G06F 3/011 |
| 10,165,326 B1 * | 12/2018 | Kline | H04N 21/816 |
| 10,325,410 B1 * | 6/2019 | Smith | G06T 11/00 |
| 10,628,982 B2 * | 4/2020 | Simpkinson | G06V 20/10 |

(Continued)

FOREIGN PATENT DOCUMENTS

WO   WO-2017120789 A1 *  7/2017  ............. G06Q 10/02

OTHER PUBLICATIONS

Goebert, Augmented Reality in Sport Marketing: Uses and Directions, pp. 134-151, Sports Innovation Journal (Year: 2020).*

(Continued)

*Primary Examiner* — Motilewa Good-Johnson

(57) ABSTRACT

A processing system including at least one processor may identify a user viewpoint of a user at a first venue, match a viewpoint at a second venue to the user viewpoint of the user at the first venue, detect a trigger condition to provide visual content of the second venue to the user at the first venue, obtain the visual content of the second venue, wherein the visual content of the second venue is obtained from the viewpoint at the second venue, and provide the visual content of the second venue to an augmented reality device of the user at the first venue, where the augmented reality device presents the visual content of the second venue as a visual overlay within a field of view of the user.

20 Claims, 8 Drawing Sheets

(56) References Cited

U.S. PATENT DOCUMENTS

| | | | |
|---|---|---|---|
| 11,113,887 B2* | 9/2021 | Kopeinigg | G06K 9/6267 |
| 11,373,405 B2* | 6/2022 | Chang | H04N 21/4345 |
| 2017/0076499 A1* | 3/2017 | Jiang | G06T 7/00 |
| 2019/0104235 A1* | 4/2019 | Sarkar | H04N 13/344 |
| 2019/0253667 A1* | 8/2019 | Valli | H04S 7/303 |
| 2020/0027256 A1* | 1/2020 | Simpkinson | G06V 10/44 |
| 2020/0027257 A1* | 1/2020 | Arana | G06T 11/60 |
| 2020/0053401 A1* | 2/2020 | Obara | H04N 21/234381 |

OTHER PUBLICATIONS

BT Sport, "Marchday Experience on the BT Sport app: Innovation that revolutionizes the way fans watch live sports", Aug. 17, 2021, accessed from https://www.bt.com/sport/features/matchday-experience-bt-sport-app-augmented-reality-watch-together, 6 pages.

Ritchie, L., "Enhancing locations with hyper-accurate AR and 5G", Oct. 17, 2019, accessed from https://medium.com/@lukeOritchie/the-new-playground-b0a998e5d02c, 14 pages.

Rogers, S., "Immersive Technology Will Augment How We Watch Sports", Forbes, Sep. 19, 2019, accessed from https://www.forbes.com/sites/solrogers/2019/09/19/immersive-technology-will-augment-how-we-watch-sports/?sh=4137603b237d, 7 pages.

Arnovitz, K., "Clippers unveil augmented game-viewing product CourtVision", ESPN, Oct. 17, 2018, accessed from https://www.espn.com/nba/story/_/id/25010640/the-la-clippers-unveil-new-augmented-game-viewing-product, 4 pages.

* cited by examiner

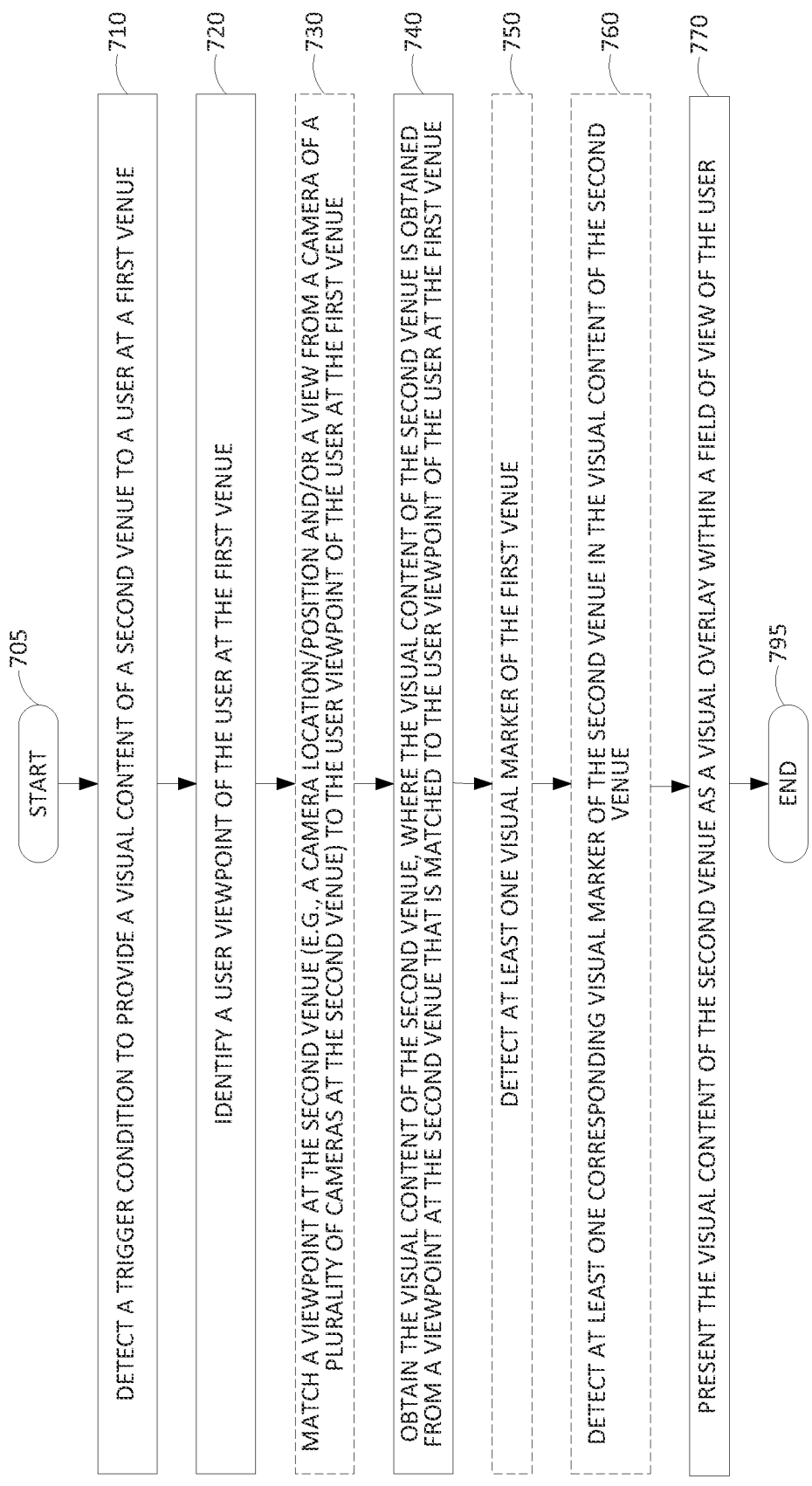

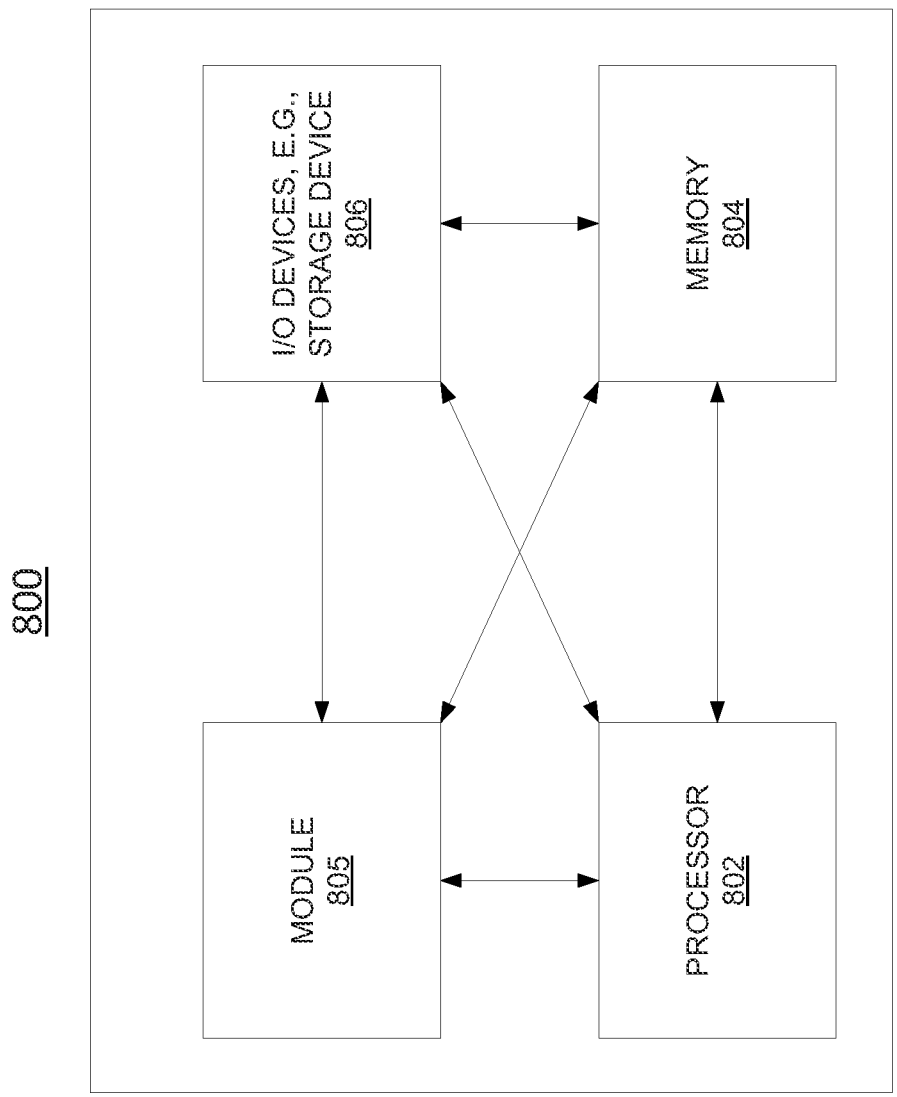

AUGMENTED REALITY EVENT SWITCHING

The present disclosure relates generally to augmented reality devices and systems, and more particularly to methods, computer-readable media, and apparatuses for obtaining and providing visual content of a second venue to an augmented reality device of a user at a first venue wherein the visual content of the second venue is obtained from a viewpoint at the second venue that is matched to a user viewpoint of the user at the first venue, and to methods, computer-readable media, and apparatuses for presenting visual content of a second venue as a visual overlay within a field of view of a user wherein the visual content is from a viewpoint at the second venue that is matched to a user viewpoint at a first venue.

BACKGROUND

Augmented reality (AR) and/or mixed reality (MR) applications and video chat usage are increasing. In one example, an AR endpoint device may comprise smart glasses with AR enhancement capabilities. For example, the glasses may have a screen and a reflector to project outlining, highlighting, or other visual markers to the eye(s) of a user to be perceived in conjunction with the surroundings. The glasses may also comprise an outward facing camera to capture video of the physical environment from a field of view in a direction that the user is looking, which may be used in connection with detecting various objects or other items that may be of interest in the physical environment, determining when and where to place AR content within the field of view, and so on.

SUMMARY

In one example, the present disclosure describes a method, computer-readable medium, and apparatus for obtaining and providing visual content of a second venue to an augmented reality device of a user at a first venue wherein the visual content of the second venue is obtained from a viewpoint at the second venue that is matched to a user viewpoint of the user at the first venue. For instance, in one example, a processing system including at least one processor may identify a user viewpoint of a user at a first venue, match a viewpoint at a second venue to the user viewpoint of the user at the first venue, detect a trigger condition to provide visual content of the second venue to the user at the first venue, obtain the visual content of the second venue, wherein the visual content of the second venue is obtained from the viewpoint at the second venue, and provide the visual content of the second venue to an augmented reality device of the user at the first venue, where the augmented reality device presents the visual content of the second venue as a visual overlay within a field of view of the user.

In another example, the present disclosure describes an apparatus, computer-readable medium, and method for presenting visual content of a second venue as a visual overlay within a field of view of a user wherein the visual content is from a viewpoint at the second venue that is matched to a user viewpoint at a first venue. For instance, an apparatus comprising a processing system including at least one processor (e.g., an augmented reality device of a user) may detect a trigger condition to provide a visual content of a second venue to the user at a first venue, identify a user viewpoint of the user at the first venue, obtain the visual content of the second venue, where the visual content of the second venue is obtained from a viewpoint at the second venue that is matched to the user viewpoint of the user at the first venue, and present the visual content of the second venue as a visual overlay within a field of view of the user.

BRIEF DESCRIPTION OF THE DRAWINGS

The teaching of the present disclosure can be readily understood by considering the following detailed description in conjunction with the accompanying drawings, in which:

FIG. 7 illustrates a flowchart of an example method for presenting visual content of a second venue as a visual overlay within a field of view of a user wherein the visual content is from a viewpoint at the second venue that is matched to a user viewpoint at a first venue; and FIG. 8 illustrates an example high-level block diagram of a computing device specifically programmed to perform the steps, functions, blocks, and/or operations described herein.

To facilitate understanding, identical reference numerals have been used, where possible, to designate identical elements that are common to the figures.

DETAILED DESCRIPTION

Figure 1:
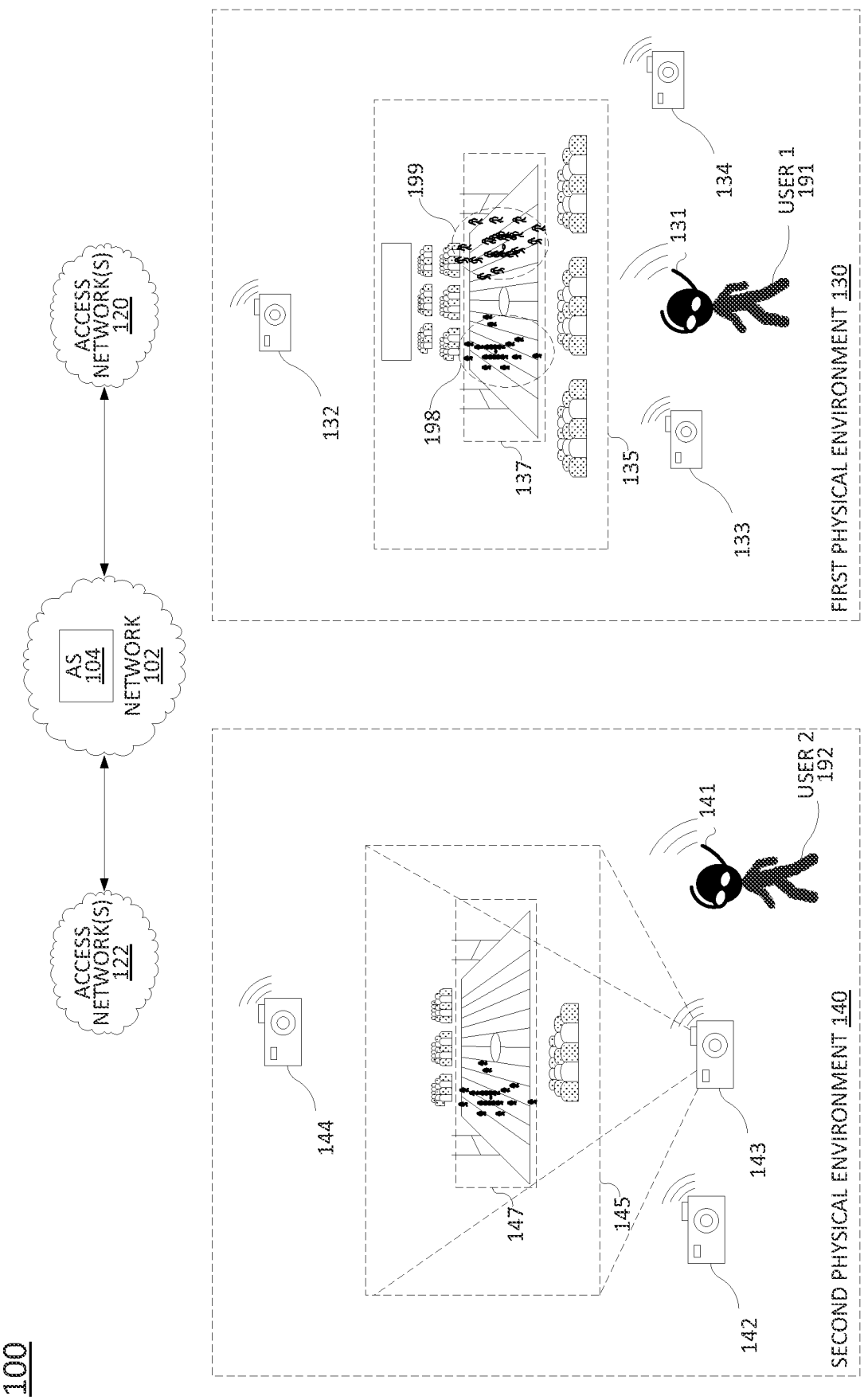
FIG. 1 illustrates an example system related to the present disclosure.

Examples of the present disclosure describe methods, computer-readable media, and apparatuses for obtaining and providing visual content of a second venue to an augmented reality device of a user at a first venue wherein the visual content of the second venue is obtained from a viewpoint at the second venue that is matched to a user viewpoint of the user at the first venue and methods, computer-readable media, and apparatuses for presenting visual content of a second venue as a visual overlay within a field of view of a user wherein the visual content is from a viewpoint at the second venue that is matched to a user viewpoint at a first venue. In particular, examples of the present disclosure enable a user to have an in-person experience and a simultaneous, or time-shifted, simulated experience by presenting content from a second venue as augmented reality (AR) content while the user is at a first venue that creates the appearance of viewing the event at the second venue as though it were occurring at the first venue. In one example, the present disclosure utilizes the user's orientation and environment in the first venue to simulate the second event as though it were occurring at the first venue.

In one example, a user may be physically present at Venue 1 observing Event 1. While present there, a simulation of Event 2 in Venue 2, which is either occurring at the same time, or a previous time, may be presented to the user. In other words, the first and second events may be occurring in real-time, e.g., at the same time, or the AR content of the second event may be time-shifted. In an illustrative example, a user may be a spectator physically present at a football game, baseball game, or other sporting events. However, it should be noted that in one example, the user may be physically present at Venue 1 at which time no particular event is taking place within or on a performance area of Venue 1 (e.g., on a field of play), while experiencing AR content from Venue 2. Other examples may include other types of events at other types of venues, such as concert halls and theaters.

To illustrate, the user may be physically present at a first venue in Los Angeles watching a football game. At certain points during the game at the Los Angeles venue, the user may view, using an augmented reality (AR) device, content related to an event at an Atlanta venue (e.g., another football game). The augmented reality content may be positioned so that it simulates a seamless experience for the user. That is, the user's view of the event at the second venue is as though the user is viewing it from the same perspective and field of view that is available from the user's position at Venue 1.

In one example, the user's AR device may also be equipped with a video camera. In one example, the camera may be used to detect expected demarcation landmarks in the user's field of view, such as field markings, numbers, or lines, goal posts, fences, or the like. These markers, or landmarks may comprise a "map" of the user's view, and may be used to represent the user's perspective, or viewpoint, in viewing the event at Venue 1. Alternatively, or in addition, a viewing perspective for each seat or seating section may be known in advance, in which case, the user's view/viewpoint may be known as long as the user's seating location or other position/location information is accessible. This map may be sent by the AR device to an AR content server, or in the event that the AR device does not have an independent network connection, by the AR device via a network connected endpoint device of the user having a local connection to the AR device. The AR content server may associate a data representation of this map with the user in a subscriber database.

At the same time, or at a previous time, an event, such as another football game, may occur at Venue 2. Venue 2 may be equipped with a plurality of video cameras and microphones, positioned throughout the venue. Each camera may be positioned so as to avoid obstructions of a field of view, while also capturing a spectator's field of view of the event and audio from the same location. In one example, each camera position at Venue 2 may be a known location/known viewpoint, e.g., in relation to one or more markers of an area of performance, such as a distance and bearing to one or more markers of a center of a field, or the like. Alternatively, or in addition, each camera may capture its own venue view map, or may provide images or video to the AR content server, which may determine the markers/landmarks within the field of view, e.g., in the same manner as described above. In one example, a data representation of the venue view map for each camera position at Venue 2 is stored in a venue mapping database. The data representation of the camera venue view map uses the same format as the user's venue view map at Venue 1.

At a point in time, the user's view at Venue 1 may be augmented so as to present AR content of an event at Venue 2 as though the event is currently occurring at Venue 1. In one example, the user may be presented with options of multiple alternative venues offering AR content, for instance, via an application (app) running on the user's AR device that is in communication with the AR content server (or via the user's endpoint device in communication with the AR device and the AR content server). The app may be responsive to the user's request to switch from one event to another. This may be accomplished via a tactile input or spoken input/voice command for example.

Upon receiving a request to switch to event 2 (e.g., to display AR content from Venue 2 and/or event 2), the AR content server may retrieve the view map for the user from the subscriber database and compare it with available seating view maps from the venue mapping database for the requested alternate venue (e.g., Venue 2). In this way, the user's current seating position at Venue 1 is compared to available camera views at Venue 2 and the closest match camera view to the user's position in Venue 1 is identified. When the closest match camera in Venue 2 is identified, AR content associated with that camera may be retrieved from the AR content database. The AR content may comprise video from the camera, audio from an accompanying microphone, or visual content extracted from the video (e.g., using video processing and editing to identify players, performers, and/or objects relevant to an event (e.g., goals, sticks, balls, etc.), distinguishing from background, and extracting these portions of the visual imagery), etc.

The AR content from the identified best match camera of Venue 2 may be sent by the AR content server to the user AR device. In one example, based on the user's view in Venue 1, portions of the view may be identified for use in AR display/projection. For instance, the area of a field, an area of a scoreboard, and so forth may be available. Using the available portions of the view, in one example, the portion of the AR content from Venue 2 that corresponds to the available portion(s) from the user's view at Venue 1 may be presented to the user via the user's AR device. In one example, the AR content may be presented as a dominant overlay such that the user can mostly pay attention to AR content from Venue 2, but also such that that real-world imagery of Venue 1 is not completely obstructed. For instance, the AR content may appear as transparent (but dominant) imagery via angled projection on a glass or similar screen within the user's field of view.

In one example, available portions of the user's view identified for use in AR display/projection may also be included in the view map, and the AR server may further select AR content matching the available area(s). Alternatively, or in addition, AR content comprising a field view may be presented as AR content, while a virtual scoreboard (or other informational blocks, for events of various types) may be generated using available informational data for the event. In this manner, the user may see simultaneous elements within the user's field of view—a real-life view, a segment of AR content to present the field view from Venue 2, and a created AR image using the additional informational data.

In one example, when the user invokes a venue switch, the user may specify the duration of the switch in advance. For example, the switch may be defined for a duration that only lasts as long as a timeout (e.g., a team calling a timeout during the game, or a commercial break event) during an event at Venue 1 where the user is physically present. In one example, the end of the timeout may be determined by the AR content server monitoring a real-time informational data source for the game. Alternatively, the user may speak a command such as: "Show me the other game until something exciting happens here." The AR content server may monitor a number of factors to determine a level of excitement, including ambient noise level of an audio stream from the venue, may use an analysis of commentary from one or more broadcast announcers, an analysis of social media activity levels for postings related to the game, a visual analysis (e.g., using video signature(s) of "start of play," or the like), and so on.

Similarly, in one example, the AR content server may monitor the status of the game at Venue 1 to detect opportunities to offer a venue view switch. For example, if a timeout, halftime, or other stops in action is determined by monitoring a real-time feed of game information, or via audio or video analysis, the AR content server may present an offer to the user to switch to another venue (or to automatically switch to another venue, e.g., Venue 2, if already selected by the user and/or previously experienced during a current session). In one example, the AR content server may present choices of other venue views that are available, and may optionally calculate an "excitement level"/score for each alternate venue and prioritize offers for the most exciting events first. The excitement level/score may be calculated by the AR content server using ambient noise levels, social media activity, time remaining, score, probability/odds of either team winning, importance of other games impacting the standing of a current team playing in Venue 1 (e.g., outcomes of other games impacting playoff chances of teams currently playing in Venue 1), and/or other factors.

When a venue view shift occurs, the AR content server may also, in conjunction with the presentation of visual AR content for the alternate venue (e.g., Venue 2), provide audio associated with the matching location of the alternate venue. For instance, the user may also have earphones to present the audio as it is streamed as a real-time feed. As such, the user may hear the ambiance as if the user is at the corresponding location/position in Venue 2. In one example, the user's app may include a social experience function. For instance, User 1 may use the app to have a voice conversation or send voice or text messages to a friend, User 2. User 1 may, for instance, invite User 2 to meet at an alternate virtual venue. For example, both User 1 and User 2 may then switch their venue views so that they both experience the switched view experience using their own seating perspectives while continuing a voice conversation. Thus, although their AR views may be from different seating perspectives, they may converse as though they were sitting together.

In another example, a user may be practicing at a first venue and may experience an AR simulation of another venue. For instance, a baseball player may be taking batting practice using an AR headset to project imagery from another stadium. In one example, the imagery from the other stadium may also include a live or recorded projection of player in the field who may chase down fly balls and grounders. This may better prepare the batter for playing in the other stadium. Similarly, in another example, a soccer player may be practicing penalty kicks at a first venue and may use an AR headset to simulate the goal, stadium, crowd, etc. from another stadium where the player has an upcoming match. These and other aspects of the present disclosure are discussed in greater detail below in connection with the examples of FIGS. 1-8.

To further aid in understanding the present disclosure, FIG. 1 illustrates an example system 100 in which examples of the present disclosure may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., in accordance with 3G, 4G/long term evolution (LTE), 5G, etc.), and the like related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102, e.g., a telecommunication service provider network, a core network, an enterprise network comprising infrastructure for computing and communications services of a business, an educational institution, a governmental service, or other enterprises. The network 102 may be in communication with one or more access networks 120 and 122, and the Internet (not shown). In one example, network 102 may combine core network components of a cellular network with components of a triple play service network; where triple-play services include telephone services, Internet services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Network 102 may further comprise a broadcast television network, e.g., a traditional cable provider network or an Internet Protocol Television (IPTV) network, as well as an Internet Service Provider (ISP) network. In one example, network 102 may include a plurality of television (TV) servers (e.g., a broadcast server, a cable head-end), a plurality of content servers, an advertising server (AS), an interactive TV/video on demand (VoD) server, and so forth.

Figure 6:
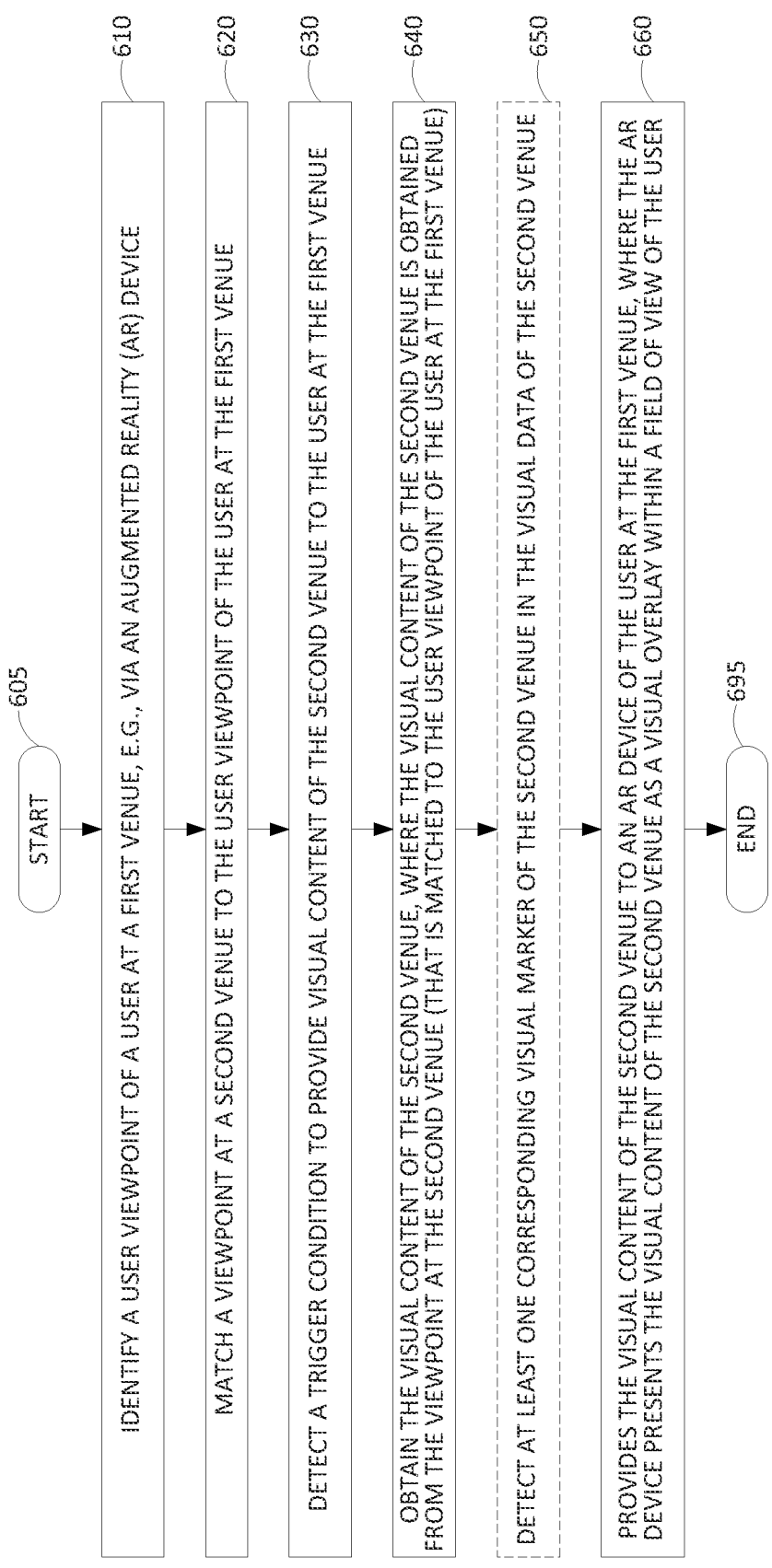
FIG. 6 illustrates a flowchart of an example method for obtaining and providing visual content of a second venue to an augmented reality device of a user at a first venue wherein the visual content of the second venue is obtained from a viewpoint at the second venue that is matched to a user viewpoint of the user at the first venue.

In accordance with the present disclosure, application server (AS) 104 may comprise a computing system or server, such as computing system 800 depicted in FIG. 8, and may be configured to provide one or more operations or functions for obtaining and providing visual content of a second venue to an augmented reality device of a user at a first venue wherein the visual content of the second venue is obtained from a viewpoint at the second venue that is matched to a user viewpoint of the user at the first venue, such as illustrated and described in connection with the example method 600 of FIG. 6. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 8 and discussed below) or multiple computing devices collectively configured to perform various steps, functions, and/or operations in accordance with the present disclosure.

Thus, although only a single application server (AS) 104 is illustrated, it should be noted that any number of servers may be deployed, and which may operate in a distributed and/or coordinated manner as a processing system to perform operations for detecting and modifying actions of visual representations of users in visual content, in accordance with the present disclosure. In one example, AS 104 may comprise an AR content server as described herein. In one example, AS 104 may comprise a physical storage device (e.g., a database server), to store various types of information in support of systems for obtaining and providing visual content of a second venue to an augmented reality device of a user at a first venue wherein the visual content of the second venue is obtained from a viewpoint at the second venue that is matched to a user viewpoint of the user at the first venue, in accordance with the present disclosure. For example, AS 104 may store object detection and/or recognition models, user data (including user device data), and so forth that may be processed by AS 104 in connection with selecting and providing visual content, e.g., AR content from remote venues to a user a particular physical venue, or that may be provided to devices obtaining such AR content via AS 104. For ease of illustration, various additional elements of network 102 are omitted from FIG. 1.

In one example, the access network(s) 120 may be in communication with a device 131. Similarly, access network(s) 122 may be in communication with one or more devices, e.g., device 141. Access networks 120 and 122 may transmit and receive communications between devices 131 and 141, between devices 131 and 141, and application server (AS) 104, other components of network 102, devices reachable via the Internet in general, and so forth. In one example, each of devices 131 and 141 may comprise any single device or combination of devices that may comprise a user endpoint device. For example, the devices 131 and 141 may each comprise a mobile device, a cellular smart phone, a wearable computing device (e.g., smart glasses) a laptop, a tablet computer, a desktop computer, an application server, a bank or cluster of such devices, and the like. In one example, devices 131 and 141 may each comprise programs, logic or instructions for presenting visual content of a second venue as a visual overlay within a field of view of a user wherein the visual content is from a viewpoint at the second venue that is matched to a user viewpoint at a first venue. For example, devices 131 and 141 may each comprise a computing system or device, such as computing system 800 depicted in FIG. 8, and may be configured to provide one or more operations or functions for presenting visual content of a second venue as a visual overlay within a field of view of a user wherein the visual content is from a viewpoint at the second venue that is matched to a user viewpoint at a first venue, such as illustrated and described in connection with the example method 700 of FIG. 7.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, 3rd party networks, and the like. For example, the operator of network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and others may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental or educational institution LANs, and the like. For instance, in one example, one of the access network(s) 120 may be operated by or on behalf of a first venue (e.g., associated with first physical environment 130). Similarly, in one example, one of the access network(s) 122 may be operated by or on behalf of a second venue (e.g., associated with second physical environment 140).

In one example, the device 131 is associated with a first user (user 1) 191 at a first physical environment 130. As illustrated in FIG. 1, the device 131 may comprise a wearable computing device (e.g., smart glasses or smart goggles) and may provide a user interface 135 for user 191. For instance, device 131 may comprise smart glasses with augmented reality (AR) enhancement capabilities. For example, endpoint device 131 may have a screen and a reflector to project outlining, highlighting, or other visual markers to the eye(s) of user 191 to be perceived in conjunction with the surroundings. Device 131 may further comprise or may be coupled to earphones, a speaker, or the like, e.g., via wired or wireless link, which may be used to present AR content comprising audio data from other venues, such as second physical environment 140. Similarly, device 131 may further include a microphone for capturing audio of the first physical environment 130 from the location of user 191. In one example, device 131 may also comprise an outward facing camera to capture video of the first physical environment 130 from a field of view shown on user interface 135 in a direction that user 191 is looking. In the present example, device 131 may present an augmented reality (AR) overlay 137 (e.g., within a user interface 135, which in the present example may be coextensive with the field of view of the user).

Also associated with physical environment 130 is a plurality of cameras 132-134 which may capture videos of the first physical environment 130, e.g., including items, objects, or other aspects of the environment. In one example, cameras 132-134 may provide video streams from various viewpoints (e.g., locations) within the first physical environment 130 to AS 104 (e.g., on an ongoing basis, or on demand). In one example, each of the cameras 132-134 may have an associated microphone (not shown) for capturing audio of the same location/viewpoint as the associated camera. Thus, it should be noted that as described herein, AR content may further include audio of a same location/viewpoint as corresponding video or other visual data derived therefrom that may be provided to a user for presentation as AR content.

In one example, the device 131 may present visual content of one or more other venues (e.g., other physical environments, such as second physical environment 140) via user interface 135 (e.g., presented as overlay 137 in FIG. 1). In one example, the physical environment 130 and user interface 135 may comprise an augmented reality (AR) or a mixed reality (MR) environment, e.g., when the physical environment 130 remains visible to user 191 when using device 131, and the visual content received from one or more other venues is presented spatially in an intelligent manner with respect to the physical environment 130. In one example, the components associated with user 191 and/or first physical environment 130 that are used to establish and support a visual communication session may be referred to as a "communication system." For instance, a communication system may comprise device 131, or device 131 in conjunction with a smartphone or personal computer, a wireless router, or the like supporting visual communication sessions of device 131, device 131 in conjunction with separate headphones, earbuds, or the like, and so on.

Similarly, device 141 may be associated with a second user (user 2) 192 at a second physical environment 140. As illustrated in FIG. 1, the device 141 may comprise a wearable computing device that is the same or similar to device 131. Device 141 may provide a user interface for user 192 similar to that which is illustrated for user 191. However, for clarity of illustration, such user interface is omitted from FIG. 1. Also associated with second physical environment 140 is a plurality of cameras 142-144 which may capture videos of the second physical environment 140, e.g., including items, objects, or other aspects of the environment. In one example, cameras 142-144 may provide video streams from various viewpoints (e.g., locations) within the second physical environment 140 to AS 104 (e.g., on an ongoing basis, or on demand). Cameras 142-144 may similarly have associated microphones for capturing audio data of the second physical environment 140 from the locations of the respective cameras 142-144.

Devices 131 and 141 may measure, record, and/or transmit data related to movement and position, such as locations, orientations, accelerations, and so forth. For instance, devices 131 and 141 may each include a Global Positioning System (GPS) unit, a gyroscope, a compass, one or more accelerometers, and so forth. In one example, devices 131 and 141 may include transceivers for wireless communications, e.g., for Institute for Electrical and Electronics Engineers (IEEE) 802.11 based communications (e.g., "Wi-Fi"), IEEE 802.15 based communications (e.g., "Bluetooth", "ZigBee", etc.), cellular communication (e.g., 3G, 4G/LTE, 5G, etc.), and so forth. Thus, for example, device 131 may provide various measurements, requests/instructions, and so forth to AS 104 (e.g., via access network(s) 120) and may similarly receive visual content of second physical environment 140 from AS 104 (and similarly for device 141).

In one example, AS 104 and device 131 may operate in a distributed and/or coordinated manner to perform various steps, functions, and/or operations described herein. To illustrate, AS 104 may establish and maintain a communication session with device 131 and may store and implement one or more configuration settings specifying which visual content from which camera of second physical environment 140 to provide to device 131, any modifications of the visual content to be applied by AS 104, and so forth. The visual content may comprise video content, which may include visual imagery of a physical environment, and which in some cases may further include recorded audio of the physical environment. In one example, the visual content may comprise a modified video content, or visual content extracted from a video obtained from one of the cameras 142-144 of the second physical environment 140, such as visual content comprising players and any equipment that are separated from visual content comprising background or "unimportant" visual content (e.g., where "unimportant" visual content may be according to a defined list of visual content that may be excluded by AS 104 and/or according to a defined list of "important" visual content, where any other content not on such a list may be segregated and discarded). Although the present examples are described primarily in connection with user 191 and device 131, it should be understood that the same or similar operations or functions may similarly apply device 141 and user 192. For instance, user 192 may obtain and experience visual content from first physical environment 130, e.g., from one of the cameras 132-134 having a location, or viewpoint within the first physical environment 130 that best matches a corresponding location, or viewpoint of user 192 within the second physical environment 140.

As used herein, the terms augmented reality (AR) environment may be used herein to refer to the entire environment experienced by a user, including real-world images and sounds combined with generated images and sounds. The generated images and sounds added to the AR environment may be referred to as "virtual objects" and may be presented to users via devices and systems of the present disclosure. While the real world may include other machine generated images and sounds, e.g., animated billboards, music played over loudspeakers, and so forth, these images and sounds are considered part of the "real-world," in addition to natural sounds and sights such as other physically present humans and the sound they make, the sound of wind through buildings, trees, etc., the sight and movement of clouds, haze, precipitation, sunlight and its reflections on surfaces, and so on.

As illustrated in FIG. 1, user 191 may be physically present at the first physical environment 130 (e.g., a first venue) watching a first event (e.g., a football game). The field of view of the user 191 may include other seats in a stadium, a field of play, and players on the field engaging in the game. In this case, the players 199 may be physically present on the field at the first physical environment 130 and visible to user 191. At an illustrative time represented by the example of FIG. 1, user 191 may determine to "switch" to viewing a second event, e.g., taking place at the second physical environment 140, as AR content obtained and presented by device 131. Alternatively, or in addition, user 191 may provide device 131 and/or AS 104 with one or more trigger conditions for switching to viewing a remote event (e.g., the second event). The trigger conditions may include stops in play, timeouts, intermissions, etc., which may be detected by audio or video content obtained by device 131 (e.g., via its own camera, microphone, and/or other sensors) and/or by AS 104 from any one or more of cameras 132-134, any associated microphone(s), etc., from informational feed(s) associated with the first physical environment 130 and/or second physical environment 140, and so forth.

In any case, when it is determined to switch to viewing the second event at second physical environment 140, AS 104 may obtain visual content from one of cameras 142-144 having a location/viewpoint in the second physical environment 140 that is a best match to a location/viewpoint of user 191 (e.g., of device 131) within the first physical environment 130. In one example, AS 104 may make the determination of which of cameras 142-144 is a best match viewpoint prior to obtaining the visual content. Alternatively, AS 104 may make a prior determination of a best match camera, and if the user 191 has not moved, or has not moved substantially from a prior location/viewpoint, then AS 104 may obtain the visual content from the camera that has already been determined.

In one example, AS 104 and/or device 131 may use a venue map of viewing locations, a GPS unit of device 131, an altimeter, etc., to determine a viewpoint/location of user 191 (and device 131). In addition, AS 104 may alternatively or additionally use a venue map of camera (and microphone) positions within second physical environment 140 (and similarly for first physical environment 130) to determine the best match camera. For instance, a distance and bearing of the location of user 191 to a particular locational marker of the first physical environment 130 may be known or determined (e.g., a distance and bearing to a center of a field of play, a distance and bearing to a closest goalpost, etc.), or similarly x,y vector component distances (or x,y,z where a height of viewing and/or seating position is relevant). Similarly, a distance and bearing, or vector component distances of a camera with respect to a same marker at the second physical environment 140 may be known and recorded in a venue map. Thus, the closest matching camera may be that which is the closest (e.g., closest vector distance of the respective camera and user locations).

In this regard, it should be noted that in one example, the venue types of the first physical environment 130 and second physical environment 140 are known in advance and are the same (e.g., both comprise football fields, which are generally standardized and include the same basic features of 100 yards plus endzones, goalposts, typically markings for every 10 yards and/or 5 yard marks, etc.). However, it should be noted that there may be substantial variations beyond the relevant areas of performance. For instance, first physical environment 130 may comprise a stadium of a professional football team having a large scoreboard, multiple levels/tiers of seating, etc., while the second physical environment 140 may comprise a single level of bleachers and a field for a small college football team. Nevertheless, visual content relating to the actual fields of play may be projected from one to the other as AR content for viewers such as user 191, etc. without regard to the peripheral settings. In one example (and as discussed in greater detail below), AS 104 and/or device 131 may alternatively or additionally use visual analysis of video from cameras 142-144 and an outward facing camera of device 131 to determine a best match camera at second physical environment 140.

For illustrative purposes, it may be assumed that camera 143 is determined to have a best match viewpoint (e.g., a closest corresponding location/position). As noted above, the visual content may comprise video (e.g., a video feed) from camera 143. Alternatively, the visual content may comprise modified video, or visual content extracted from such video. In the present example, the visual content may correspond to the window 147. However, in one example, the window 147 may comprise less than all of a field of view, or "viewport" of camera 143. For instance, camera 143 may be capable of capturing all of window 145. In one example, video comprising all of window 145 may be obtained by AS 104 from camera 143, whereupon AS 104 may determine that window 147 comprises the visual content that should be provided to device 131 and may extract the visual content of window 147. In another example, camera 143 may be adjusted such that the zoom is aligned to the window 147, e.g., to the field of play plus an additional region comprising a defined distance around the field, or the like. In the example of FIG. 1, the visual content from camera 143 may be provided by AS 104 to device 131. Device 131 may then present the visual content as overlay 137. In this case, the visual content from camera 143 that is presented may include the players 198 made visible within the portion of the field of view of user interface 135 comprising overlay 137.

In one example, the visual content from camera 143 presented via device 131 (e.g., the "AR content") may include all of the video obtained from window 147. In this case, imagery of the entire field at the second physical environment 140, the players on the field, the goalposts, etc. may all be part of the visual content that is provided to and presented by device 131 within overlay 137. In another example, the imagery of players 198 may be segregated from the imagery of the field and other background within video from camera 143, such that only the player images are part of the visual content presented via overlay 137. In any case, the AR content presented in overlay 137 may be presented as a "dominant" overlay, e.g., with a transparency that is selected with the intention that within the region of the field of view of the user interface 135 comprising the overlay 137, user 191 will primarily perceive the AR content, while the real-world aspects of the first physical environment 130 may remain slightly visible in the coincident portions of overlay 137. However, in one example, the transparency may be adjustable by user 191 via command or input to device 131, may be adjustable by device 131 in response to certain conditions, such as changing ambient light levels, sunlight, glare, etc. at first physical environment 130, any emergencies or other defined occurrences, such as detection of user 191 attempting to walk or otherwise move around, another person present within one meter in front of device 131, another person talking to user 191 from a position in front of device 131, or the like, which may be detected by device 131 (such as using machine learning (ML)-based detection models applied to video from an outward facing camera of device 131, audio from a microphone, position and orientation data from a gyroscope, compass, GPS unit, etc.), and so forth.

In one example, AS 104 may store detection models that may be applied by AS 104 or deployed to user devices (such as device 131), in order to detect items of interest in video from cameras 132-134, cameras 142-144, outward facing cameras of devices 131 and 141, etc. For instance, in accordance with the present disclosure, the detection models may be specifically designed for detecting fields, field lines, goals, fences, or other expected portions of playing areas, for detecting players, balls, bats, sticks, pucks, or other equipment, scoreboards, viewing boxes, etc. (and similarly for stages, instruments, performers, podiums, set pieces, and so forth for other types of events). The MLMs, or signatures, may be specific to particular types of visual/image and/or spatial sensor data, or may take multiple types of sensor data as inputs. For instance, with respect to images or video, the input sensor data may include low-level invariant image data, such as colors (e.g., RGB (red-green-blue) or CYM (cyan-yellow-magenta) raw data (luminance values) from a CCD/photo-sensor array), shapes, color moments, color histograms, edge distribution histograms, etc. Visual features may also relate to movement in a video and may include changes within images and between images in a sequence (e.g., video frames or a sequence of still image shots), such as color histogram differences or a change in color distribution, edge change ratios, standard deviation of pixel intensities, contrast, average brightness, and the like. For instance, these features could be used to help quantify and distinguish plastic seats from a concrete floor, metal railings, etc. In one example, the detection models may be to detect particular items, objects, or other physical aspects of an environment (e.g., field lines defining boundaries of an area of play, or within the area of play).

In one example, MLMs, or signatures, may take multiple types of sensor data as inputs. For instance, MLMs or signatures may also be provided for detecting particular items based upon LiDAR input data, infrared camera input data, and so on. In accordance with the present disclosure, a detection model may comprise a machine learning model (MLM) that is trained based upon the plurality of features available to the system (e.g., a "feature space"). For instance, one or more positive examples for a feature may be applied to a machine learning algorithm (MLA) to generate the signature (e.g., a MLM). In one example, the MLM may comprise the average features representing the positive examples for an item in a feature space. Alternatively, or in addition, one or more negative examples may also be applied to the MLA to train the MLM. The machine learning algorithm or the machine learning model trained via the MLA may comprise, for example, a deep learning neural network, or deep neural network (DNN), a generative adversarial network (GAN), a support vector machine (SVM), e.g., a binary, non-binary, or multi-class classifier, a linear or non-linear classifier, and so forth. In one example, the MLA may incorporate an exponential smoothing algorithm (such as double exponential smoothing, triple exponential smoothing, e.g., Holt-Winters smoothing, and so forth), reinforcement learning (e.g., using positive and negative examples after deployment as a MLM), and so forth. It should be noted that various other types of MLAs and/or MLMs may be implemented in examples of the present disclosure, such as k-means clustering and/or k-nearest neighbor (KNN) predictive models, support vector machine (SVM)-based classifiers, e.g., a binary classifier and/or a linear binary classifier, a multi-class classifier, a kernel-based SVM, etc., a distance-based classifier, e.g., a Euclidean distance-based classifier, or the like, and so on. In one example, a trained detection model may be configured to process those features which are determined to be the most distinguishing features of the associated item, e.g., those features which are quantitatively the most different from what is considered statistically normal or average from other items that may be detected via a same system, e.g., the top 20 features, the top 50 features, etc.

In one example, detection models (e.g., MLMs) may be trained and/or deployed by AS 104 to process videos from cameras 132-134, cameras 142-144, outward facing cameras of devices 131 and 141, or the like, and/or other input data to identify patterns in the features of the sensor data that match the detection model(s) for the respective item(s). In one example, a match may be determined using any of the visual features mentioned above, e.g., and further depending upon the weights, coefficients, etc. of the particular type of MLM. For instance, a match may be determined when there is a threshold measure of similarity among the features of the video or other data streams(s) and an item/object signature. Similarly, in one example, AS 104 may apply an object detection and/or edge detection algorithm to identify possible unique items in video or other visual information (e.g., without particular knowledge of the type of item; for instance, the object/edge detection may identify an object in the shape of a tree in a video frame, without understanding that the object/item is a tree). In this case, visual features may also include the object/item shape, dimensions, and so forth. In such an example, object recognition may then proceed as described above (e.g., with respect to the "salient" portions of the image(s) and/or video(s)). In this regard, it should be noted that in one example, performance areas (such as fields of play in FIG. 1, and in other examples, stages, pools, rinks, etc.) may have designated markings such that these locations are visually identifiable and may have an associated detection model that may detect such locations from images captured from various videos/camera feeds.

In one example, AS 104 may use such detection models to scan video feeds from cameras 142-144 of second physical environment 140 to determine a best matching video to a viewpoint of user 131 (e.g., as determined by applying the same detection model(s) to identify features in a feed from an outward facing camera of device 131) and then selecting a camera with a video feed having the most matching features (e.g., in terms of the items detected and the positions of such items). In one example, AS 104 may also use such detection models to identify items or objects to extract, to include, to exclude, and so forth with regard to the visual content to be provided from camera 143 to device 131.

In one example, AS 104 may label visual markers within the visual content relating to a performance area, such as markers for detected corners of a field, markers for a detected center of a field, a marker for a detected goal, goalpost, or the like, and so forth. For instance, these may comprise pixel coordinates of the field corners, and such. Thus, for example, device 131 may receive the visual content of camera 143 from AS 104, may detect corresponding visual markers of the performance area of first physical environment 130 within field of view of user interface 135 of an outward facing camera of device 131, and may then align the presentation of visual content from camera 143 (e.g., the AR content) using the received visual markers and the corresponding visual markers detected in the first physical environment 130.

In one example, AS 104 may further train, possess, and/or apply detection models for detecting occurrences of particular occurrence types, such as a detection model for "excitement" in a stadium, a detection model for "excitement" of an announcer, "encroachment of personal space", etc. Such detection models may use visual features, including motion-based features in video, audio features, or both for detecting various occurrences in accordance with the present disclosure. In addition, such detection models of the present disclosure may also relate to audio features including low-level audio features, including: spectral centroid, spectral roll-off, signal energy, mel-frequency cepstrum coefficients (MFCCs), linear predictor coefficients (LPC), line spectral frequency (LSF) coefficients, loudness coefficients, sharpness of loudness coefficients, spread of loudness coefficients, octave band signal intensities, and so forth. Such audio features may also include high-level features, such as: words and phrases. In one example, one or more detection models for one or more occurrence types may be deployed to device 131 for local use (e.g., to detect a situation where there is a danger to the user, or where an interruption in considered warranted such that AR content should be made more transparent or should cease to be presented).

The foregoing illustrates just one example of a system in which examples of the present disclosure for obtaining and providing visual content of a second venue to an augmented reality device of a user at a first venue wherein the visual content of the second venue is obtained from a viewpoint at the second venue that is matched to a user viewpoint of the user at the first venue and/or for presenting visual content of a second venue as a visual overlay within a field of view of a user wherein the visual content is from a viewpoint at the second venue that is matched to a user viewpoint at a first venue may operate. In addition, although the foregoing example(s) is/are described and illustrated in connection with a single viewer (user 191) at an event at first physical environment 130 and with a single alternative venue (e.g., second physical environment 140), it should be noted that various other scenarios may be supported in accordance with the present disclosure. For instance, user 191 may be provided with choices of multiple alternative venues from which AR content may be obtained and presented. In another example, user 191 may be present at the first physical environment 130, but there may be no current event taking place at such venue, e.g., the home team is away playing a game at a different city. Nevertheless, user 191 (and other users) may experience one or more other events at one or more other venues as AR content (e.g., other venues of a same venue type), which may be live/current and/or which may be historical, time-shifted events. In still another example, AS 104 may establish a voice or video call between users, such as user 191 and user 192 via devices 131 and 141 to experience the same event at the same time (e.g., the event at first physical environment 130, the event at second physical environment 140, or an event at a third venue where neither user 191 nor user 192 is physically present). Although the viewing perspectives may be different, the occurrences within the event may be experienced at the same time and discussed contemporaneously.

It should also be noted that the system 100 has been simplified. In other words, the system 100 may be implemented in a different form than that illustrated in FIG. 1. For example, the system 100 may be expanded to include additional networks, and additional network elements (not shown) such as wireless transceivers and/or base stations, border elements, routers, switches, policy servers, security devices, gateways, a network operations center (NOC), a content distribution network (CDN) and the like, without altering the scope of the present disclosure. In addition, system 100 may be altered to omit various elements, substitute elements for devices that perform the same or similar functions and/or combine elements that are illustrated as separate devices.

As just one example, one or more operations described above with respect to server(s) 104 may alternatively or additionally be performed by device 131, and vice versa. In addition, although a single AS 104 is illustrated in the example of FIG. 1, in other, further, and different examples, the same or similar functions may be distributed among multiple other devices and/or systems within the network 102, access network(s) 120 or 122, and/or the system 100 in general that may collectively provide various services in connection with examples of the present disclosure for obtaining and providing visual content of a second venue to an augmented reality device of a user at a first venue wherein the visual content of the second venue is obtained from a viewpoint at the second venue that is matched to a user viewpoint of the user at the first venue and/or for presenting visual content of a second venue as a visual overlay within a field of view of a user wherein the visual content is from a viewpoint at the second venue that is matched to a user viewpoint at a first venue. Additionally, devices that are illustrated and/or described as using one form of communication (such as a cellular or non-cellular wireless communications, wired communications, etc.) may alternatively or additionally utilize one or more other forms of communication. Thus, these and other modifications are all contemplated within the scope of the present disclosure.

Figure 2:
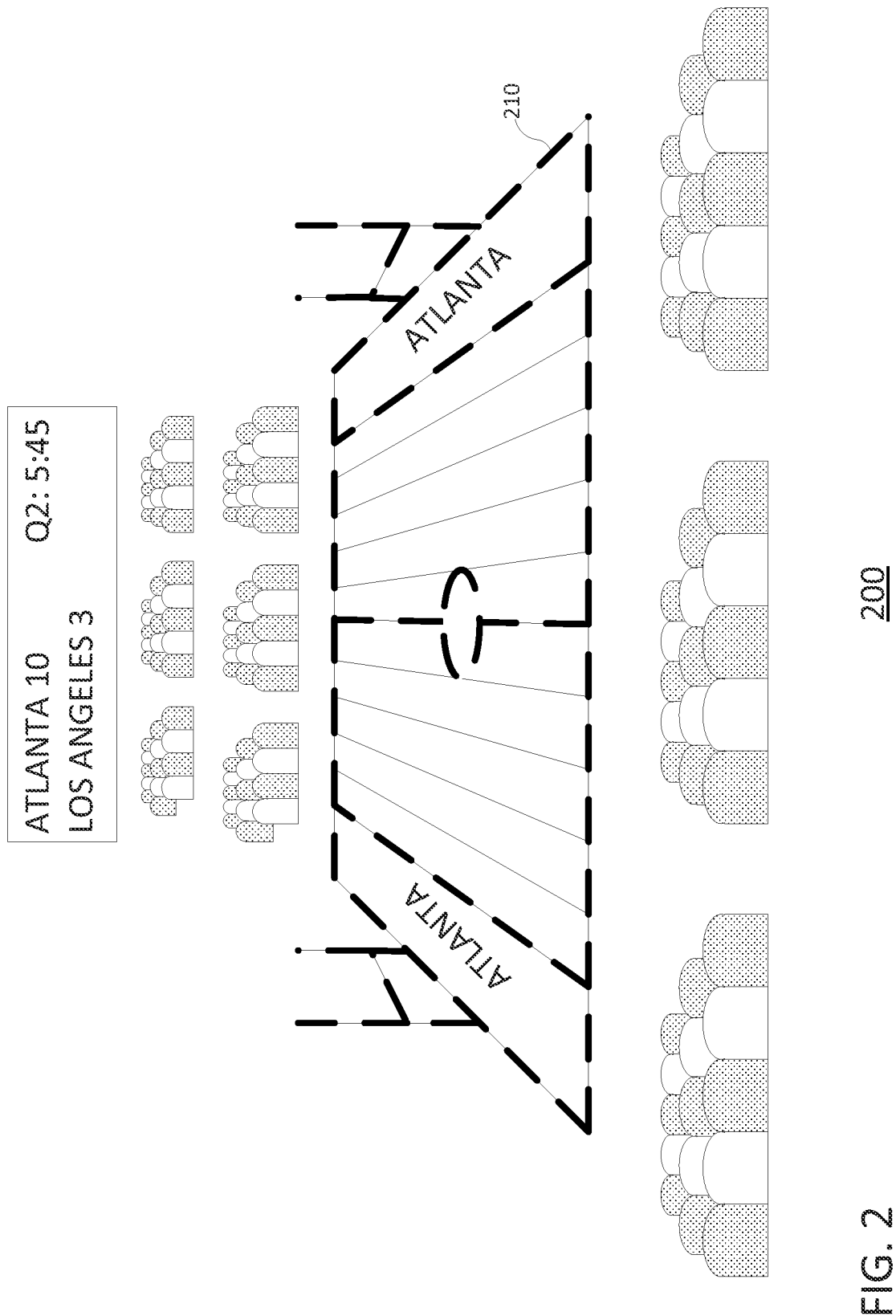
FIG. 2 illustrates an example of detecting visual markers at a venue, in accordance with the present disclosure.

To further aid in understanding the present disclosure, FIG. 2 illustrates an example of detecting visual markers at a venue 200. The venue 200 may be the same or similar to the first physical environment 130 of FIG. 1 (e.g., a football stadium). In accordance with the present disclosure, AR devices, such as devices 131 and 141 of FIG. 1, may be configured to detect particular visual markers associated with particular venue types. It should be noted that an AR device may also comprise a mobile endpoint device, such as a smartphone, performing the same operations, wherein the presentation to the user is accomplished via a coupled AR headset (e.g., where the headset performs more limited functions of displaying visual AR content (and in some cases audio content), reporting orientation information, providing captured video and/or audio, etc.). To illustrate, football fields are generally standardized and include the same basic features of 100 yards length plus endzones, goalposts, etc. Similarly, baseball fields typically include three bases, a home plate, a pitcher's mound, base lines/foul ball lines, and in some cases, foul poles, outfield walls/fences, infield dirt, etc. Likewise, theaters may generally include a stage and curtains framing the stage, and so on for various other types of venues. Thus, for example, a user may provide an input indicating the type of venue, or an AR device may determine the type of venue via detection/recognition models for detecting different types of event venues, via electronic calendar or other information accessible to an app running on a user's AR device, and so on. In one example, based on the venue type of a venue at which the AR device is physically present, an AR device may then determine particular visual markers that may be used to align AR content from another venue. In the example of FIG. 2, the venue 200 is a football stadium. Accordingly, in an illustrative example, visual markers 210 that may be used to align AR content may comprise field borders, endzone lines, center line, center circle, and/or goalposts. In one example, the AR device may provide these visual markers to an AR content server (such as 104 of FIG. 1) for use in matching a user viewpoint at venue 200 to a particular available camera viewpoint at another venue. Alternatively, or in addition, the AR device may use the visual markers to align AR content (e.g., visual content) from another venue as overlay content within a field of view of the AR device.

Figure 3:
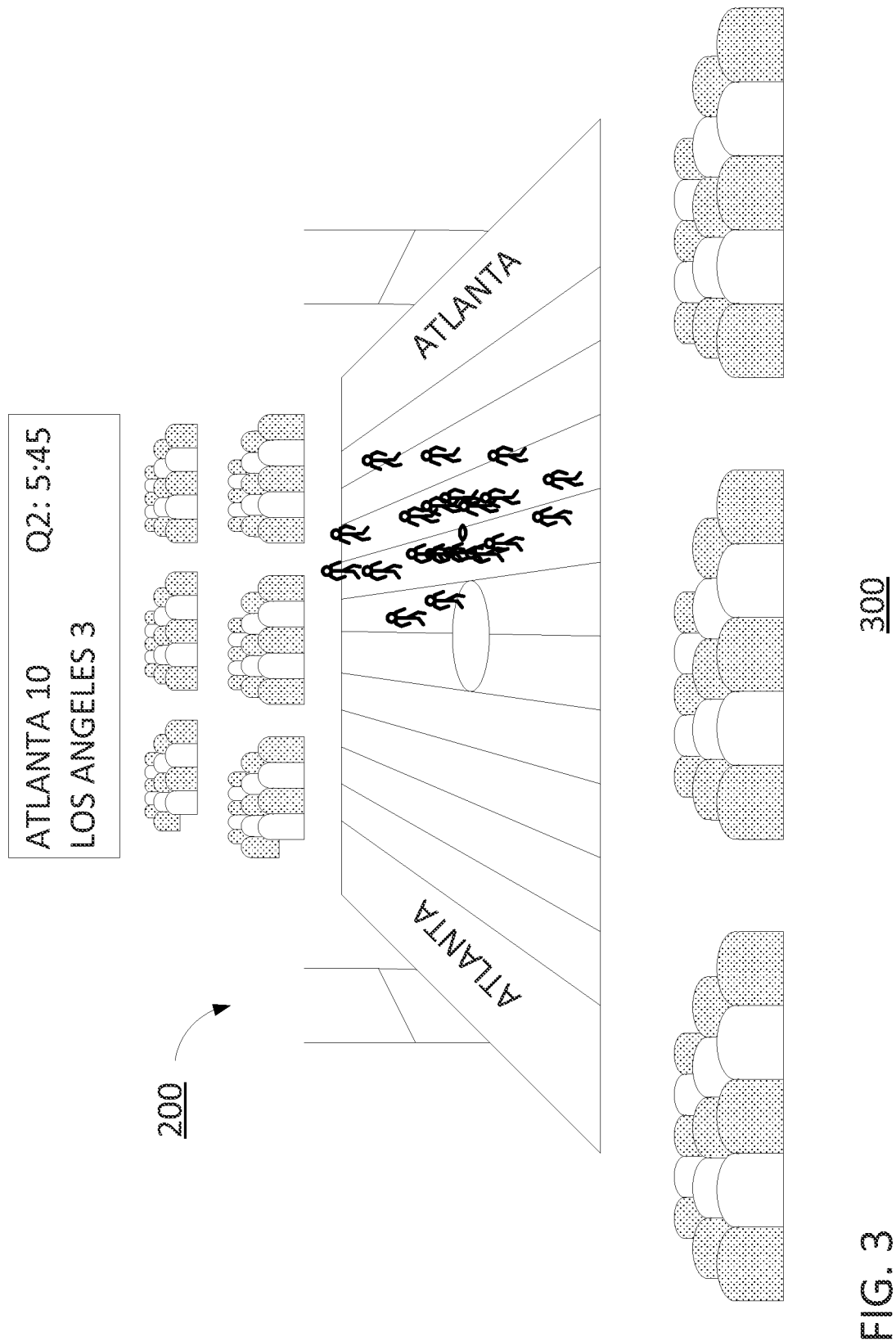
FIG. 3 illustrates an example view (which may be a non-augmented reality view) of a venue during an event, in accordance with the present disclosure.
Figure 4:
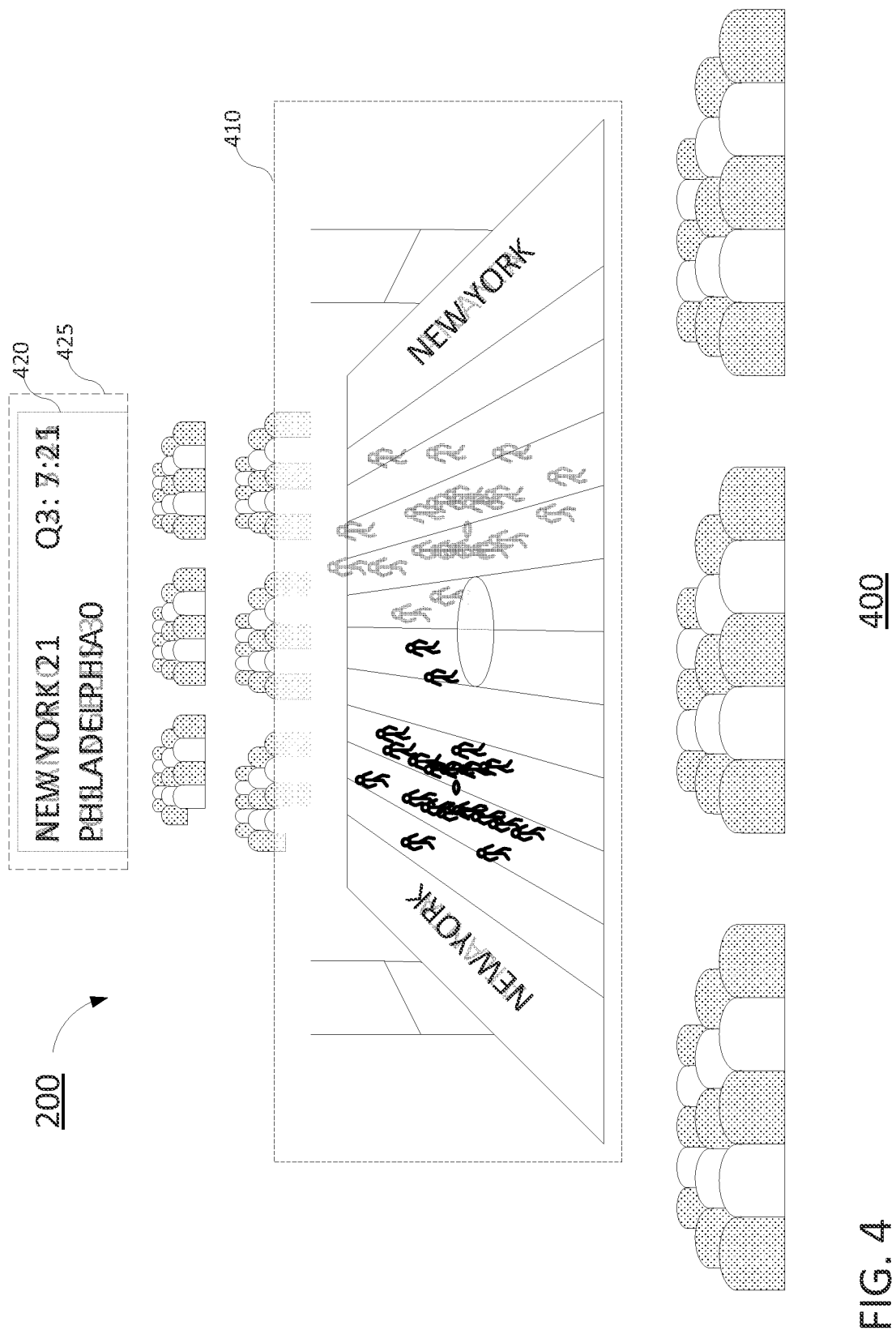
FIG. 4 illustrates an example view representing the visual experience of a user at a venue who is physically present during a live in-person event, but who is currently experiencing AR content from another venue via an AR device of the user, in accordance with the present disclosure.

FIG. 3 illustrates an example view 300, which may be a non-AR view of venue 200 of FIG. 2 during an event, e.g., a football game between an Atlanta team and a Los Angeles team. FIG. 4 illustrates an example view 400, which may represent the visual experience of a user at the venue 200 who is physically present during the event illustrated in FIG. 3, but who is currently experiencing AR content from another venue via an AR device of the user. For instance, as illustrated in FIG. 4, the AR device may present, as an overlay 410, visual content from another football game between a New York team and a Philadelphia team taking place at another venue. As can be seen in FIG. 4, the overlay 410 may comprise a dominant overlay (e.g., a visually dominant overlay), such that the AR content may be primarily visible, while the real-world imagery of the venue 200 remains visible with the overlay 410 having some level of transparency.

It should be noted that in one example, the AR device of the user may receive the AR content from the other venues, and may use the visual markers previously identified to align the AR content with the current view of the user based upon orientation of the AR device. For instance, the AR device may identify visual markers in the AR content (e.g., the same or similar visual markers 210 identified in the real-world view of venue 200 illustrated in FIG. 2; in this case, end lines, goal posts, etc.). Alternatively, or in addition, the visual markers in the AR content may be included as additional information provided to the AR device along with the AR content (e.g., from an AR content server). Thus, the AR device may determine the correct position and/or orientation in which to project the AR content as overlay 410 and/or within overlay 410 such that the visual markers of the AR content are in the same positions as the corresponding visual markers in the real-world imagery of venue 200.

The example of FIG. 4 further illustrates that in one example, the AR device and/or AR content server may also identify additional visible regions that may be used to project event information. For example, the AR device and/or AR content server may detect a scoreboard 420, e.g., using an object detection/recognition model for "scoreboard," and may use this region to project a virtual scoreboard 425 for information relating to the event at the other venue (e.g., the score from the New York-Philadelphia game, the time remaining in the game, etc.). The projection of virtual scoreboard 425 may involve aligning in the same or similar manner as the AR content presented in overlay 410.

Figure 5:
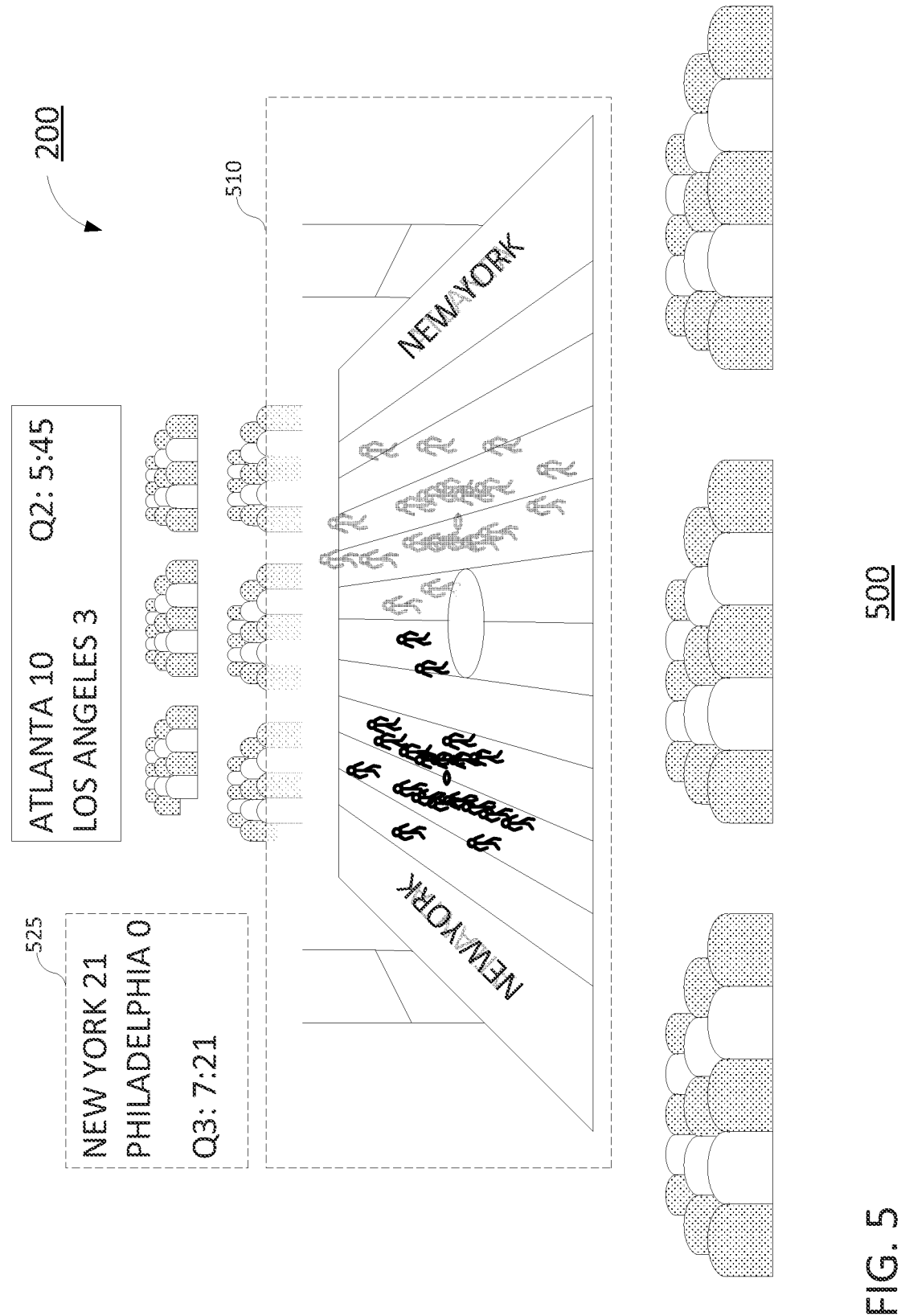
FIG. 5 illustrates an alternate example view, which may be similar to the view of FIG. 4, but in which a virtual scoreboard is presented in addition to augmented reality content in an overlay.

FIG. 5 illustrates an alternative example view 500, which may be similar to the view 400, but in which a virtual scoreboard 525 is presented in addition to AR content in an overlay 510 (which may be the same or similar to overlay 410 of FIG. 4). In this case, a region within a field of view of the user may be selected for presentation of the virtual scoreboard 525. For instance, the AR device may select a region that is determined to be "unimportant" or "available for projection." For example, other regions in the field of view may be determined to be "important" according to defined rules, e.g., detected area of performance, scoreboard(s), etc. may be designated as "important" and/or "not available for virtual scoreboard projection, etc. Thus, for instance, the user may perceive the scoreboard 520 with a view that is unobstructed, may see that play has resumed at the live/in-person event at venue 200, and may choose to switch back to watching the live/in-person event.

FIG. 6 illustrates a flowchart of an example method 600 for obtaining and providing visual content of a second venue to an augmented reality device of a user at a first venue wherein the visual content of the second venue is obtained from a viewpoint at the second venue that is matched to a user viewpoint of the user at the first venue. In one example, steps, functions and/or operations of the method 600 may be performed by a device or apparatus as illustrated in FIG. 1, e.g., by AS 104, or any one or more components thereof, or by AS 104, and/or any one or more components thereof in conjunction with one or more other components of the system 100, such as device 131, camera(s) 142-144, and so forth. In one example, the steps, functions, or operations of method 600 may be performed by a computing device or processing system, such as computing system 800 and/or hardware processor element 802 as described in connection with FIG. 8 below. For instance, the computing system 800 may represent any one or more components of the system 100 that is/are configured to perform the steps, functions and/or operations of the method 600. Similarly, in one example, the steps, functions, or operations of the method 600 may be performed by a processing system comprising one or more computing devices collectively configured to perform various steps, functions, and/or operations of the method 600. For instance, multiple instances of the computing system 800 may collectively function as a processing system. For illustrative purposes, the method 600 is described in greater detail below in connection with an example performed by a processing system. The method 600 begins in step 605 and proceeds to step 610.

At step 610, the processing system identifies a user viewpoint of a user at a first venue, e.g., via an augmented reality (AR) device, or AR endpoint device. For instance, the user viewpoint may comprise a position of the AR device (e.g., also comprising the position of the user) relative to a performance area of the venue (e.g., in relation to one or more locational/positional markers of venue). In one example, the locational/positional markers may be identified by seat number, row, section, etc., may be identified by geographic coordinates and/or coordinates with respect to a reference coordinate system of the venue, and so on. For instance, a distance and bearing of the location of the user to a particular locational marker of the first venue may be known or determined (e.g., a distance and bearing to a center of a field of play, a distance and bearing to a closest goalpost, etc.), or similarly x,y vector component distances (or x,y,z where a height of viewing and/or seating position is relevant). In another example, the user viewpoint may be represented as locations of visual markers of a performance area of the venue within one or more images of the venue from a field of view of the AR device. For example, the visual markers may be such as illustrated in FIG. 2 and discussed above, or the like. In one example, the visual markers may be provided by the AR device, or the processing system may obtain visual data from the AR device (e.g., image(s) and/or video from an outward facing camera) from which the processing system may detect visual markers via one or more detection models such as discussed above.

At step 620, the processing system matches a viewpoint at a second venue to the user viewpoint of the user at the first venue, e.g., where an event is occurring at the second venue to be viewed by the user as visual content, or AR content, via an AR device of the user at the first venue. In one example, step 620 may comprise matching a first position of the user viewpoint of the user at the first venue to a second position of the viewpoint of the second venue. In accordance with the present disclosure, the first venue and the second venue may be of a same venue type. Thus, in one example, the first venue and the second venue may have corresponding areas of performance. In one example, a distance and bearing, or vector component distances of a camera with respect to a same locational/positional marker at a second venue may be known and recorded in a venue map of the second venue. Thus, the closest matching viewpoint may be a viewpoint of a camera that is the closest relative distance (e.g., closest vector distance of the respective camera and user viewpoint/location). For instance, the user viewpoint may comprise a first position at the first venue and the viewpoint of the second venue may comprise a second position at the second venue. In one example, the first position may comprise a first seat at the first venue and the second position may comprise a second seat at the second venue. In one example, step 620 may include determining that the first seat position and the second seat position have a same orientation and distance to corresponding performance areas of the first venue and the second venue (e.g., the first seat has a first orientation and a first distance to a first performance area of the first venue, the second seat has a second orientation and a second distance to the second performance area of the second venue, the first orientation and the second orientation are the same, the first distance and the second distance are the same, and the first performance area and the second performance area are of a same type and have same dimensions, or as close thereto as available). In one example, the matching of step 620 may be via respective venue maps of the first venue and the second venue.

In another example, step 620 may alternatively or additionally comprise visual analysis of video from cameras at the second venue to determine a best matching viewpoint (e.g., of one of the available cameras). For instance, step 620 may comprise aligning at least one visual marker of the areas of performance (e.g., aligning at least one visual marker of the first venue and at least one corresponding visual marker of the second venue). Thus, for example, the at least one visual marker of the first venue may be obtained from a visual feed video from the augmented reality device of the user, and the at least one corresponding visual marker of the second venue may be obtained from at least one device at the second venue that provides the visual content of the second venue (e.g., at least one camera, a server aggregating video feeds from multiple cameras at the second venue, etc.). To illustrate, the processing system may scan video feeds from cameras of the second venue to determine a best matching video to the user viewpoint (e.g., as determined by applying the same detection model(s) to identify features in a feed from an outward facing camera of the AR device and selecting a camera with a video feed having the most matching features (e.g., in terms of the items detected and the positions of such items)).

In one example, the at least one visual marker may comprise at least one of: a field line, at least a portion of a goal (such as a goal post, crossbar, etc.), a wall, a portion of an infield, a foul post, a rink board, a lane line (e.g., for a track, swimming, or rowing venue, for example), a backboard and/or a hoop (e.g., for a basketball venue), at least one net (e.g., a tennis net, a volleyball net, etc.), at least one track feature (such as curves and straightaways, starting line, etc. for either track and field, car racing, etc.), and so on. For instance, the first and second venues may be of a sporting venue type (e.g., a baseball field and/or stadium, a football field and/or stadium, a hockey rink and/or arena, a pool, etc.). In another example, the first venue and the second venue have corresponding areas of performance comprising stages (e.g., of a theater or the like). In such an example, the at least one visual marker may comprise at least one feature shared by the corresponding stages (such as a front edge, the stage ends, which may be identified by where the stage edge meets curtains, etc.). It should again be noted that the event at the second venue may be contemporaneous (live), or may be recorded and made available to the user in a time-shifted manner. For example, the first venue may comprise a local sports field where the user may watch a historical professional sporting event.

At step 630, the processing system detects a trigger condition to provide visual content of the second venue to the user at the first venue. In one example, the trigger condition may comprise a user input via the AR device. In one example, the user input may also include a defined duration of the switch to viewing an event at the second venue and/or a trigger condition for switching back to a live/in-person view of the first venue, e.g., an exciting play at the first venue, an end of a time out, etc. In one example, the trigger condition may comprise an occurrence of a defined occurrence type at one of the first venue or the second venue (e.g., a beginning or end of a time out, a start or end of a period, half, or quarter, an exciting play, etc.). Thus, in various examples the trigger condition may be detected from: at least one of audio data of the first venue or video data of the first venue, at least one of audio data of the second venue or video data of the second venue, an announcement at the first venue or the second venue, a voice pattern of an announcer at the first venue or the second venue, and so on. It should be noted that audio or visual data of first venue and/or second venue for detecting the occurrence do not necessarily need to come from first viewpoint and second viewpoint, but may use any general camera or microphone for the entire venue, or a handful of cameras and/or microphones.

Examples of trigger conditions may include, a stop in play, a start in play, a volume exceeding a first threshold, a volume below a second threshold, a sound pattern of the occurrence type, a voice pattern of an announcer indicative of a current importance of the first event or the second event, an announcement indicative of a break in the first event or the second event, an announcement indicative of a start of the first event or the second event, an announcement indicative of a resumption of the first event or the second event after a break, visual data indicative of a break, a start, or a resumption of the first event or the second event, visual data indicative of a current importance of the first event or the second event, and so forth. It should be noted that the present method 600 does not require that there be an event (such as a game, concert, performance, etc.) at the first venue. However, in numerous examples there may be an event occurring at the first venue that may affect whether and when the AR device may be switched between a view of AR content of the second venue and a live/in-person view of the first venue.

At step 640, the processing system obtains the visual content of the second venue, where the visual content of the second venue is obtained from the viewpoint at the second venue (that is matched to the user viewpoint of the user at the first venue). For instance, step 640 may include obtaining video from a camera of the second venue having a closest corresponding viewpoint the user viewpoint (or visual content derived from such video).

At optional step 650, the processing system may detect at least one corresponding visual marker of the second venue in the visual data of the second venue. For instance, optional step 650 may include detecting positions within the visual data of field lines, goal posts, stage edge(s), etc., in the same or similar manner as discussed above.

At step 660, the processing system provides the visual content of the second venue to an AR device of the user at the first venue, where the AR device presents the visual content of the second venue as a visual overlay within a field of view of the user. For instance, the AR device may present the visual content as a visual overlay when the user looks in the direction of a play/performance area of the first venue having a corresponding play/performance area of the second from which the visual content is captured from the viewpoint at the second venue. In one example, the AR device may align at least one visual marker of the first venue and at least one corresponding visual marker of the second venue for the presenting. In one example, step 660 may include providing the at least one corresponding visual marker that may be determined at optional step 650 to the AR device.

Following step 660, the method 600 proceeds to step 695. At step 695, the method 600 ends.

It should be noted that the method 600 may be expanded to include additional steps, or may be modified to replace steps with different steps, to combine steps, to omit steps, to perform steps in a different order, and so forth. For instance, in one example, the processing system may repeat one or more steps of the method 600, such as step 610-660 for different viewing locations, different users, etc., steps 620-660 for the same user at a different time during a same visit to the first venue, and so on. In one example, the method 600 may comprise performing step 630 prior to step 610, e.g., wherein step 610 and subsequent steps may be performed in response to the detecting of the trigger condition. In one example, the method 600 may include obtaining authorization to gather video of the first venue from the AR device of the user, which can be provided to others seeking to view AR content from the first venue while at the second venue (or another venue). In this regard, it should be noted that one or more cameras of the second venue discussed above may also comprise user devices that may be opted-in to visual content sharing (and in one example, accompanying audio data sharing). In one example, the method 600 may include providing a choice of available venues from which to obtain AR content and obtaining a user selection of the second venue.

It should be noted that "visual content" of the second venue may be video from a camera having a closest corresponding viewpoint to the user viewpoint, but may also comprise extracted portions of the video. Thus, "video data" of the second venue that may be used at step 630 could be the same visual data that is provided to the user at the first venue at step 660, the same video from which visual data comprising less than all of the video is extracted and provided to the user, or could be a different video (e.g., from a different camera). In various other examples, the method 600 may further include or may be modified to comprise aspects of any of the above-described examples in connection with FIGS. 1-5, or as otherwise described in the present disclosure. Thus, these and other modifications are all contemplated within the scope of the present disclosure.

FIG. 7 illustrates a flowchart of an example method 700 for presenting visual content of a second venue as a visual overlay within a field of view of a user wherein the visual content is from a viewpoint at the second venue that is matched to a user viewpoint at a first venue. In one example, steps, functions and/or operations of the method 700 may be performed by a device or apparatus as illustrated in FIG. 1, e.g., by device 131, or any one or more components thereof, or by device 131, and/or any one or more components thereof in conjunction with one or more other components of the system 100, such as 104, camera(s) 142-144, and so forth. In one example, the steps, functions, or operations of method 700 may be performed by a computing device or processing system, such as computing system 800 and/or hardware processor element 802 as described in connection with FIG. 8 below. For instance, the computing system 800 may represent any one or more components of the system 100 that is/are configured to perform the steps, functions and/or operations of the method 700. Similarly, in one example, the steps, functions, or operations of the method 700 may be performed by a processing system comprising one or more computing devices collectively configured to perform various steps, functions, and/or operations of the method 700. For instance, multiple instances of the computing system 800 may collectively function as a processing system. For illustrative purposes, the method 700 is described in greater detail below in connection with an example performed by a processing system. The method 700 begins in step 705 and proceeds to step 710.

At step 710, the processing system (e.g., of a user endpoint device/augmented reality device) detects a trigger condition to provide a visual content of a second venue to a user at a first venue. As noted above, the first venue and the second venue may be of a same venue type. Accordingly, the first venue and the second venue may have corresponding areas of performance (e.g., stages for performance, fields, rinks, pools, etc.). The trigger condition may comprise a user input (via the augmented reality device), or an occurrence of a defined occurrence type at one of the first venue or the second venue. For instance, the occurrence may be detected via one or more detection models in the same or similar manner as discussed above. In one example, step 710 may comprise the same or similar operations as step 630 of the example method 600 of FIG. 6 discussed above (e.g., however performed by the processing system of the augmented reality device in connection with the method 700).

At step 720, the processing system identifies a user viewpoint of the user at the first venue. In one example, step 720 may comprise the same or similar operations as step 610 of the example method 600 of FIG. 6 discussed above (e.g., however performed by the processing system of the augmented reality device in connection with the method 700).

At optional step 730, the processing system may match a viewpoint at the second venue (e.g., a camera location/position and/or a view from a camera of a plurality of cameras at the second venue) to the user viewpoint of the user at the first venue. It should be noted that step 730 may be optional insofar as, in one example, the matching may be performed by a network-based processing system or server, e.g., an AR content server. In one example, optional step 730 may comprise the same or similar operations as step 620 of the example method 600 of FIG. 6 discussed above (e.g., however performed by the processing system of the augmented reality device in connection with the method 700). For instance, in one example, the matching may comprise aligning at least one visual marker of the areas of performance.

At step 740, the processing system obtains the visual content of the second venue, where the visual content of the second venue is obtained from a viewpoint at the second venue that is matched to the user viewpoint of the user at the first venue. In one example, the visual content may be obtained from a camera of the second venue (e.g., having the matched viewpoint/location) via a network-based processing system or server, e.g., an AR content server.

At optional step 750, the processing system may detect at least one visual marker of the first venue. For instance, the at least one visual marker may be detected in images/video from a camera of the processing system (e.g., an outward facing camera of the AR device of the processing system). In one example, optional step 750 may comprise the performance of operations similar to step 620 of the example method 600 of FIG. 6 (e.g., however performed by the processing system of the augmented reality device in connection with the method 700)

At optional step 760, the processing system may detect at least one corresponding visual marker of the second venue in the visual content of the second venue. For instance, the at least one corresponding visual marker may be detected in the same or similar manner as the at least one visual marker is detected at optional step 750. In one example, optional step 760 may comprise the performance of operations similar to step 650 of the example method 600 of FIG. 6 (e.g., however performed by the processing system of the augmented reality device in connection with the method 700).

At step 770, the processing system presents the visual content of the second venue as a visual overlay within a field of view of the user. In one example, step 770 may include aligning at least one visual marker of the first venue and at least one corresponding visual marker of the second venue. For instance, the visual content may be projected as transparent (but dominant) imagery via angled projection on a glass or similar screen within the user's field of view. In one example, the transparency may be selected such that the user will primarily perceive the AR content (visual content from the second venue), while the real-world aspects of the first venue may remain slightly visible in the coincident portions of the overlay.

Following step 770, the method 700 proceeds to step 795. At step 795, the method 700 ends.

It should be noted that the method 700 may be expanded to include additional steps, or may be modified to replace steps with different steps, to combine steps, to omit steps, to perform steps in a different order, and so forth. For instance, in one example, the processing system may repeat one or more steps of the method 700, such as step 710-760 for different viewing locations, for a different time during a same visit to the first venue, for the same user at a different venue, and so on. In one example, the method 700 may be modified to perform step 720 prior to step 710. In one example, the method 700 may include detecting a trigger condition for switching back to viewing an in-person event at the first venue (or simply viewing in-person real-world imagery of the first venue, if there is no current event taking place at the first venue), and ceasing the presentation of the visual content from the second venue in response thereto. In one example, the method 700 may include selecting and or adjusting a transparency of the overlay, e.g., in response to changing light levels or other conditions. In one example, the method 700 may include obtaining authorization to gather and share video of the first venue (e.g., as AR content for others seeking to view an event at the first venue while physically present at the second venue (or another venue)), and providing video or visual content derived therefrom, in response to the authorization. In one example, the method 700 may include providing a choice of available venues from which to obtain AR content and obtaining a user selection of the second venue. In another example, the method 700 may include identifying usable areas for projection, e.g., a field of play and any scoreboard(s) of the first venue that may be used for projecting video from a field of play for the event at the second venue and additional information, such as scores, time remaining, etc., for the event at the second venue as a virtual scoreboard, for instance. In one example, the method 700 may include presenting additional AR content comprising an additional overlay with information from one or more other venues (e.g., a third venue, etc.). In various other examples, the method 700 may further include or may be modified to comprise aspects of any of the above-described examples in connection with FIGS. 1-6, or as otherwise described in the present disclosure. Thus, these and other modifications are all contemplated within the scope of the present disclosure.

In addition, although not expressly specified above, one or more steps of the method 600 or the method 700 may include a storing, displaying and/or outputting step as required for a particular application. In other words, any data, records, fields, and/or intermediate results discussed in the method(s) can be stored, displayed and/or outputted to another device as required for a particular application. Furthermore, operations, steps, or blocks in FIGS. 6 and 7 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

FIG. 8 depicts a high-level block diagram of a computing system 800 (e.g., a computing device or processing system) specifically programmed to perform the functions described herein. For example, any one or more components, devices, and/or systems illustrated in FIG. 1 or described in connection with FIGS. 2-7, may be implemented as the computing system 800. As depicted in FIG. 8, the computing system 800 comprises a hardware processor element 802 (e.g., comprising one or more hardware processors, which may include one or more microprocessor(s), one or more central processing units (CPUs), and/or the like, where the hardware processor element 802 may also represent one example of a "processing system" as referred to herein), a memory 804, (e.g., random access memory (RAM), read only memory (ROM), a disk drive, an optical drive, a magnetic drive, and/or a Universal Serial Bus (USB) drive), a module 805 for obtaining and providing visual content of a second venue to an augmented reality device of a user at a first venue wherein the visual content of the second venue is obtained from a viewpoint at the second venue that is matched to a user viewpoint of the user at the first venue and/or for presenting visual content of a second venue as a visual overlay within a field of view of a user wherein the visual content is from a viewpoint at the second venue that is matched to a user viewpoint at a first venue, and various input/output devices 806, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one hardware processor element 802 is shown, the computing system 800 may employ a plurality of hardware processor elements. Furthermore, although only one computing device is shown in FIG. 8, if the method(s) as discussed above is implemented in a distributed or parallel manner for a particular illustrative example, e.g., the steps of the above method(s) or the entire method(s) are implemented across multiple or parallel computing devices, then the computing system 800 of FIG. 8 may represent each of those multiple or parallel computing devices. Furthermore, one or more hardware processor elements (e.g., hardware processor element 802) can be utilized in supporting a virtualized or shared computing environment. The virtualized computing environment may support one or more virtual machines which may be configured to operate as computers, servers, or other computing devices. In such virtualized virtual machines, hardware components such as hardware processors and computer-readable storage devices may be virtualized or logically represented. The hardware processor element 802 can also be configured or programmed to cause other devices to perform one or more operations as discussed above. In other words, the hardware processor element 802 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer-readable instructions pertaining to the method(s) discussed above can be used to configure one or more hardware processor elements to perform the steps, functions and/or operations of the above disclosed method(s). In one example, instructions and data for the present module 805 for obtaining and providing visual content of a second venue to an augmented reality device of a user at a first venue wherein the visual content of the second venue is obtained from a viewpoint at the second venue that is matched to a user viewpoint of the user at the first venue and/or for presenting visual content of a second venue as a visual overlay within a field of view of a user wherein the visual content is from a viewpoint at the second venue that is matched to a user viewpoint at a first venue (e.g., a software program comprising computer-executable instructions) can be loaded into memory 804 and executed by hardware processor element 802 to implement the steps, functions or operations as discussed above in connection with the example method(s). Furthermore, when a hardware processor element executes instructions to perform operations, this could include the hardware processor element performing the operations directly and/or facilitating, directing, or cooperating with one or more additional hardware devices or components (e.g., a co-processor and the like) to perform the operations.

The processor (e.g., hardware processor element 802) executing the computer-readable instructions relating to the above described method(s) can be perceived as a programmed processor or a specialized processor. As such, the present module 805 for obtaining and providing visual content of a second venue to an augmented reality device of a user at a first venue wherein the visual content of the second venue is obtained from a viewpoint at the second venue that is matched to a user viewpoint of the user at the first venue and/or for presenting visual content of a second venue as a visual overlay within a field of view of a user wherein the visual content is from a viewpoint at the second venue that is matched to a user viewpoint at a first venue (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium may comprise a physical device, a hardware device, or a device that is discernible by the touch. More specifically, the computer-readable storage device or medium may comprise any physical devices that provide the ability to store information such as instructions and/or data to be accessed by a processor or a computing device such as a computer or an application server.

While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:

1. A method comprising:
   identifying, by a processing system comprising at least one processor, a user viewpoint of a user at a first venue;
   matching, by the processing system, a viewpoint at a second venue to the user viewpoint of the user at the first venue, wherein the first venue has a first area of performance and the second venue has a second area of performance, wherein the matching comprises aligning at least one first visual marker of the first area of performance with at least one second visual marker of the second area of performance, wherein the at least one first visual marker of the first venue is obtained from a video from an augmented reality device of the user, wherein the at least one second visual marker of the second venue is obtained from at least one device at the second venue that provides a visual content of the second venue;
   detecting, by the processing system, a trigger condition to provide the visual content of the second venue to the user at the first venue;
   obtaining, by the processing system, the visual content of the second venue, wherein the visual content of the second venue is obtained from the viewpoint at the second venue; and
   providing, by the processing system, the visual content of the second venue to the augmented reality device of the user at the first venue, wherein the augmented reality device presents the visual content of the second venue as a visual overlay within a field of view of the user.

2. The method of claim 1, wherein the first venue and the second venue are of a same venue type.

3. The method of claim 2, wherein the same venue type comprises a sporting venue type, wherein the at least one first visual marker or the at least one second visual marker comprises at least one of:
   at least one field line;
   at least a portion of a goal;
   at least one wall;
   at least a portion of an infield;
   at least one foul ball post;
   at least one rink board;
   at least one lane line;
   at least one net;
   at least one backboard;
   at least one hoop; or
   at least one track feature.

4. The method of claim 2, wherein the first venue and the second venue have corresponding stages for performance, wherein the at least one first visual marker and the at least one second visual marker comprise at least one feature shared by the corresponding stages.

5. The method of claim 1, wherein the trigger condition comprises a user input via the augmented reality device.

6. The method of claim 1, wherein the trigger condition comprises an occurrence of a defined occurrence type at one of: the first venue or the second venue.

7. The method of claim 6, wherein the trigger condition is detected from:
   at least one of audio data of the first venue or video data of the first venue;
   at least one of audio data of the second venue or video data of the second venue;
   an announcement at the first venue or the second venue; or
   a voice pattern of an announcer at the first venue or the second venue.

8. The method of claim 1, wherein the matching comprises:
   matching a first position of the user viewpoint of the user at the first venue to a second position of the viewpoint of the second venue.

9. The method of claim 8, wherein the first position comprises a first seat at the first venue, and wherein the second position comprises a second seat at the second venue.

10. The method of claim 8, wherein first position and the second position have a same orientation and distance to corresponding first and second performance areas of the first venue and the second venue.

11. A non-transitory computer-readable medium storing instructions which, when executed by a processing system including at least one processor, cause the processing system to perform operations, the operations comprising:
identifying a user viewpoint of a user at a first venue;
matching a viewpoint at a second venue to the user viewpoint of the user at the first venue, wherein the first venue has a first area of performance and the second venue has a second area of performance, wherein the matching comprises aligning at least one first visual marker of the first area of performance with at least one second visual marker of the second area of performance, wherein the at least one first visual marker of the first venue is obtained from a video from an augmented reality device of the user, wherein the at least one second visual marker of the second venue is obtained from at least one device at the second venue that provides a visual content of the second venue;
detecting a trigger condition to provide the visual content of the second venue to the user at the first venue;
obtaining the visual content of the second venue, wherein the visual content of the second venue is obtained from the viewpoint at the second venue; and
providing the visual content of the second venue to the augmented reality device of the user at the first venue, wherein the augmented reality device presents the visual content of the second venue as a visual overlay within a field of view of the user.

12. The non-transitory computer-readable medium of claim 11, wherein the first venue and the second venue are of a same venue type.

13. The non-transitory computer-readable medium of claim 12, wherein the same venue type comprises a sporting venue type, wherein the at least one first visual marker or the at least one second visual marker comprises at least one of:
at least one field line;
at least a portion of a goal;
at least one wall;
at least a portion of an infield;
at least one foul ball post;
at least one rink board;
at least one lane line;
at least one net;
at least one backboard;
at least one hoop; or
at least one track feature.

14. The non-transitory computer-readable medium of claim 12, wherein the first venue and the second venue have corresponding stages for performance, wherein the at least one first visual marker and the at least one second visual marker comprise at least one feature shared by the corresponding stages.

15. The non-transitory computer-readable medium of claim 11, wherein the trigger condition comprises a user input via the augmented reality device.

16. The non-transitory computer-readable medium of claim 11, wherein the trigger condition comprises an occurrence of a defined occurrence type at one of: the first venue or the second venue.

17. The non-transitory computer-readable medium of claim 16, wherein the trigger condition is detected from:
at least one of audio data of the first venue or video data of the first venue;
at least one of audio data of the second venue or video data of the second venue;
an announcement at the first venue or the second venue; or
a voice pattern of an announcer at the first venue or the second venue.

18. An apparatus comprising:
a processing system including at least one processor; and
a computer-readable medium storing instructions which, when executed by the processing system, cause the processing system to perform operations, the operations comprising:
detecting, a trigger condition to provide a visual content of a second venue to a user at a first venue, wherein the apparatus comprises an augmented reality device of the user;
identifying a user viewpoint of the user at the first venue;
matching a viewpoint at the second venue to the user viewpoint of the user at the first venue, wherein the first venue and the second venue have corresponding areas of performance;
obtaining the visual content of the second venue, wherein the visual content of the second venue is obtained from the viewpoint at the second venue that is matched to the user viewpoint of the user at the first venue; and
presenting the visual content of the second venue as a visual overlay within a field of view of the user, wherein the presenting comprises aligning at least one visual marker of the first venue and at least one corresponding visual marker of the second venue, wherein the at least one visual marker of the first venue is obtained from a video from the augmented reality device of the user, wherein at least one corresponding visual marker of the second venue is obtained from at least one device at the second venue that provides the visual content of the second venue.

19. The apparatus of claim 18, wherein the first venue and the second venue are of a same venue type.

20. The apparatus of claim 18, wherein the trigger condition comprises a user input, or an occurrence of a defined occurrence type at one of: the first venue or the second venue.

* * * * *